UNITED STATES PATENT OFFICE 2,559,667

AZO DYE INTERMEDIATES OF THE ANTHRAQUINONE SERIES

Herman E. Schroeder, Wilmington, Del., and Joseph Deinet, Glassboro, N. J., assignors to E. I. du Pont de Nemours & Company, Wilmington, Del., a corporation of Delaware No Drawing. Application June 17, 1949, Serial No. 99,871

6 Claims. (Cl. 260—207.1)

This invention relates to the preparation of new dye intermediates of the anthraquinone series which are more particularly azobiphenylcarbonylaminoanthraquinone compounds.

While a number of vat dyes in the yellow range have been used in the dyeing and printing of textiles, the fastness properties of these yellow colors are poor as compared with the fastness properties of many of the other colors in the vat dye class. Where yellow dyes in this class with improved fastness properties have been found, they in turn are either dull or weak tinctorially and therefore the various yellow dyes in the vat dye class are chosen to answer a particular need, balancing the question of fastness, brightness and cost of the particular dye available.

It is an object of the present invention to produce new and valuable dye intermediates particularly useful as acylating agents in the manufacture of yellow vat dyes of desirable shades, which dyes exhibit improved tinctorial strength and fastness properties over previously known dyes of similar shade. It is a further object of the invention to produce new dye intermediates which themselves can be ring closed to form vat dyes having good tinctorial strength and fastness properties.

The compounds of this invention have the following general formula:

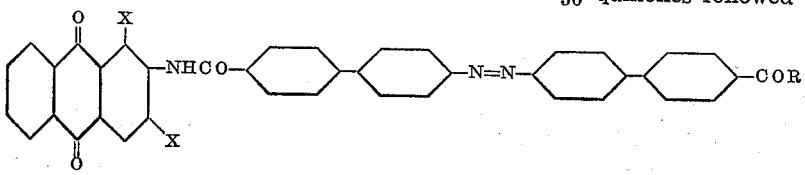

in which at least one of the positions X is occupied by chlorine or bromine and R is a member of the group consisting of —OH, —NH$_2$, —Cl and —O-alkyl. These compounds it will be noted contain a free carboxylic acid radical or a functional derivative thereof, through which further condensation may be effected to product other dyes.

The compounds of this invention may be prepared by reacting an ortho-halogen-substituted beta-aminoanthraquinone with 4,4'-azobiphenyl-4'',4'''-dicarbonyl chloride in substantially equal molecular quantites in an inert solvent under anhydrous conditions. The reaction is preferably carried out at temperatures of from 120°–200° C., and the resulting products are isolated by filtration and recovered in substantially quantitative yields. In this reaction the condensation of the beta-aminoanthraquinone appears to take place substantially quantitatively on one end of the dicarbonyl chloride only, for by analysis the resulting product appears to be uniform in its composition and substantially a pure compound. This is also borne out by the fact that, on subsequent reaction to produce other and valuable dyes, it reacts as a substantially pure compound. The halogen-beta-aminoanthraquinone employed is preferably the 1-halogen-2-aminoanthraquinone or the 1,3-dihalogen-2-aminoanthraquinone, although the compounds resulting from the 3-halogen-2-aminoanthraquinone are also obtained in a good yield and serve as valuable intermediates in the preparation of other vat dyes of excellent dyeing and fastness properties.

When the compounds of this invention having the formula above given are further reacted with aminoanthraquinones or aminothiophanthraquinones followed by ring closures such as may be effected in the presence of soda ash, potassium acetate, and condensation catalysts as more particularly described in copending applications Serial No. 99,873 and Serial No. 99,877 1,2(N)-oxazoles, which are yellow dyes of extraordinary tinctorial strength and fastness properties, are obtained in excellent yields.

The following examples are given to illustrate the invention. The parts used are by weight.

Example 1

Thirty (30) parts of 1-chloro-2-aminoanthraquinone are suspended in 800 parts of nitrobenzene; 0.3 part of pyridine and 54 parts of 4,4'-azobiphenyl-4'',4'''-dicarbonyl chloride are added while agitating, and the mass heated to 138°–142° C. and maintained for 6 hours. It is then cooled, filtered, washed with benzene and dried. The product forms a pale yellow powder analyzing 10.20% chlorine (calculated 10.44%) and is obtained in a yield of 98% of theory. It is considered as having the following formula:

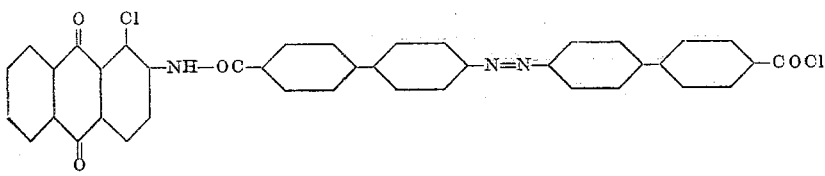

Example 2

Fifty (50) parts of 2-amino-3-bromoanthraquinone are suspended in 1250 parts of nitrobenzene; 0.5 part of pyridine and 76 parts of 4,4'-azobiphenyl-4'',4'''-dicarbonyl chloride are added while agitating and the mass is heated to 140° C. and maintained for 2 hours, then heated to 208°–210° C. and held for ½ hour. It is then cooled, filtered, washed with benzene and dried. The product forms a pale yellow powder and is obtained in excellent yield. It is represented by the formula:

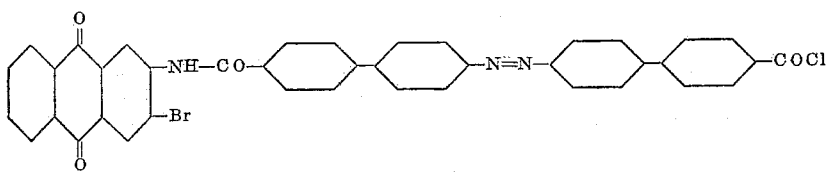

Example 3

Twenty-five (25) parts of 1,3-dibromo-3-aminoanthraquinone are suspended in 550 parts of nitrobenzene; 0.3 part of pyridine and 30 parts of 4,4'-azobiphenyl-4'',4'''-dicarbonyl chloride are added while agitating and the mass heated to 138°–140° C. and maintained for 6 hours, then heated to 190°–195° C. and held for ½ hour. It is then cooled, filtered, washed with benzene and dried. The resulting dibromo compound forms a pale yellow powder and is obtained in very good yields.

Example 4

Forty (40) parts of 1-chloro-2-aminoanthraquinone are suspended in 1500 parts of nitrobenzene; 0.5 part of pyridine and 77 parts of 4,4'-azobiphenyl-4'',4'''-dicarbonyl chloride are added while agitating and the mass heated to 138°–140° C. and maintained for 6 hours. It is cooled to 125° C. and treated with ammonia for 3 to 4 hours. After cooling the mass is filtered, washed with benzene, alcohol and hot water in turn, and dried. The product forms a weak yellow powder. It is obtained in good yields and has the following probable formula:

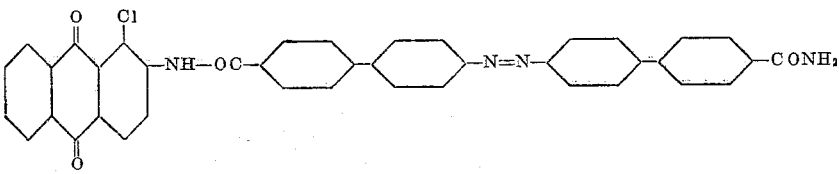

On conversion to the oxazole as described above, it affords a greenish-yellow vat dyestuff of good tinctorial strength and fastness, particularly to light.

Example 5

A mixture of 2-amino-1-bromo-3-chloroanthraquinone (3.35 parts), 4,4'-azobiphenyl-4'',4'''-dicarbonyl chloride (4.6 parts) and dry nitrobenzene (80 parts) was heated 6 hours at 140°–150° C., cooled to 80° C., filtered and washed with dry nitrobenzene and benzene. A good yield of the bright yellow mono-acid chloride is obtained having a melting range of 355°–357° C. with decomposition. It has the formula:

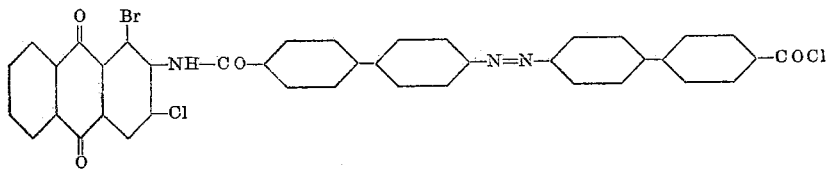

Example 6

Sixty (60) parts of 4,4'-azobiphenyl-4'',4'''-dicarboxylic acid (sodium salt) are suspended in 1200 parts of nitrobenzene; 1.5 parts of pyridine and 50 parts of thionyl chloride are added while agitating, and the mass is heated to 95° C. and maintained for 12 hours. It is then air-blown for one-half hour (to take out excess of thionyl chloride) and cooled to 50° C., then 33 parts of 1-chloro-2-aminoanthraquinone are added. The mass is heated to 135°–138° C. and maintained for 6 hours. It is cooled to 60° C., 25 parts of methyl alcohol are added and the mass is heated to 125°–135° C. and maintained for 3 hours. After cooling, the mass is filtered, the cake washed with nitrobenzene and then with alcohol, and dried. The product forms a weak yellow powder. It is obtained in good yields, and has the following formula:

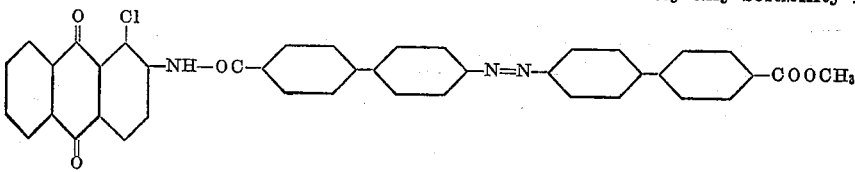

The product is pale yellow, gives a brownish vat, but has little affinity until converted to an oxazole.

*Example 7*

By replacing the methyl alcohol in Example 6 with 50 parts of dodecyl alcohol, a product having the following formula is obtained:

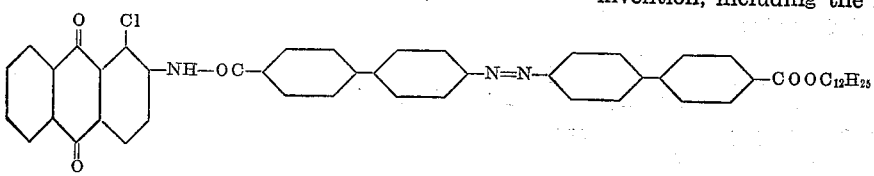

It is a pale yellow solid, much more soluble in nitrobenzene than the methyl homolog, which is sparingly soluble even at elevated temperatures.

In the same manner as illustrated in the above examples, any of the aliphatic alcohols containing from 1 to 18 carbon atoms may be employed instead of the methyl alcohol or the dodecyl alcohol to give compounds carrying the ester group which are valuable dye intermediates. These esters may be readily hydrolyzed to the free alcohol by heating in aqueous causic solution or in alcoholic caustic solution.

Any of the compounds of this invention containing the free acid chloride group such as illustrated in the above examples may be readily converted to the compounds containing the free carboxylic acid group, by dissolving the acid chloride compound in concentrated sulfuric acid at from 5° to 10° C. This effects the hydroysis of the acid chloride group, with the liberation of hydrochloric acid. These compounds containing the free carboxylic acid group are yellow-brown powders which vat readily to an orange-brown solution. (The acid chloride compound before hydrolysis is not readily vattable.) The compound containing the free carboxylic acid group dissolves in sulfuric acid with an orange-brown color and without further evolution of hydrochloric acid. It has very little affinity for cotton from the usual alkaline hydrosulfite vat, and shows scarcely any solubility in caustic alkali solution.

On acidification of a brown alkaline suspension of the free acid compound it turns from brown to yellow, indicating the formation of the free acid compound.

With the exception of those containing the free acid chloride group the compounds of this invention, including the long chain alkyl esters, may be readily converted to vat dyes by effecting ring closure of the oxazole group. This may be carried out in nitrobenzene or other solvent by means of a copper condensation catalyst and in the presence of an acid binding agent. If desired, the ring closure may be effected in the same solvent and without isolation from the reaction mass in which it was formed by the condensation of the dicarboxylic acid chloride and the halogen aminoanthraquinone.

The 4,4'-azobiphenyl-dicarboxylic acid employed in the above examples is readily prepared by the sodium hydroxide-glucose reduction of 4,4'-nitrophenyl benzoic acid. The dicarboxylic acid is converted to the acid chloride by treating the free acid or its sodium salt with thionyl chloride, or phosphorus pentachloride in an inert solvent such as aromatic hydrocarbons or the chlorinated or nitrated aromatic hydrocarbons. The 4,4'-azobiphenyl-4'',4'''-dicarbonyl chloride has a melting point of 260°–262° C.

We claim:

1. The compounds of the general formula:

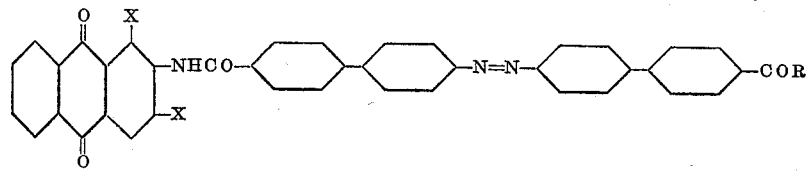

in which at least one X stands for a halogen of the group consisting of chlorine and bromine and R is a substituent of the group consisting of —OH, —NH₂, —Cl and —O-alkyl, which alkyl group may contain from 1 to 18 carbon atoms.

2. The compound of the formula:

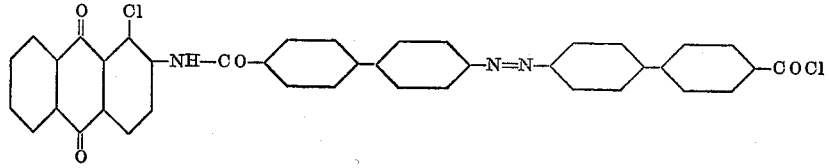

3. The compound of the formula:
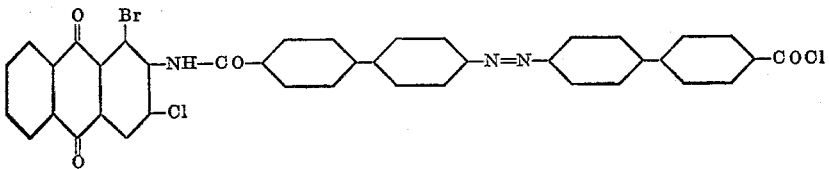
4. The compound of the formula:
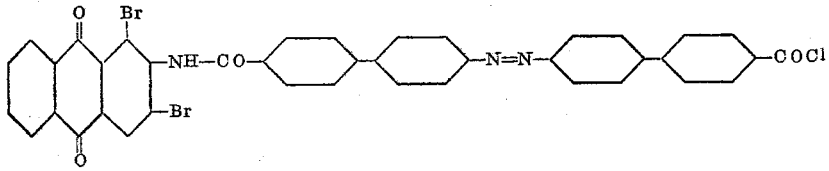
5. The compound of the formula:
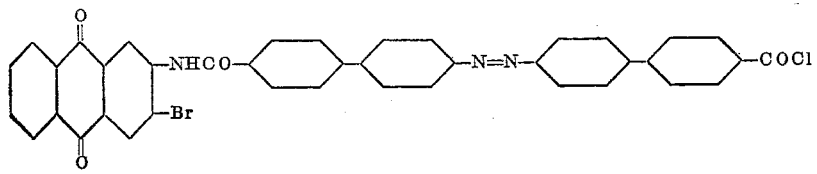
6. The compound of the formula:
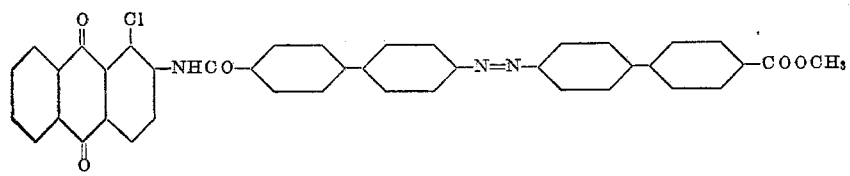
HERMAN E. SCHROEDER.
JOSEPH DEINET.
REFERENCES CITED
The following references are of record in the file of this patent:
FOREIGN PATENTS
| Number | Country | Date |
|---|---|---|
| 848,018 | France | July 17, 1939 |